(12) United States Patent
Goldberg et al.

(10) Patent No.: US 12,734,768 B2
(45) Date of Patent: Sep. 15, 2026

(54) COMPOSITE PRESSURE HULL AND METHODS OF FORMING

(71) Applicant: The Boeing Company, Arlington, VA (US)

(72) Inventors: James Goldberg, Mukilteo, WA (US); Brice Aaron Johnson, Toledo, WA (US); Mark Alan Negley, Clyde Hill, WA (US); Adriana Willempje Blom-Schieber, Snohomish, WA (US); Jaffar Sher Iqbal, Seattle, WA (US); Lisa C. Zgherea, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/678,731

(22) Filed: May 30, 2024

(65) Prior Publication Data

US 2025/0100235 A1 Mar. 27, 2025

Related U.S. Application Data

(60) Provisional application No. 63/584,684, filed on Sep. 22, 2023.

(51) Int. Cl.

| | |
|---|---|
| ***B29C 70/30*** | (2006.01) |
| ***B29C 70/54*** | (2006.01) |
| ***B29D 22/00*** | (2006.01) |
| ***B29L 31/00*** | (2006.01) |
| ***F17C 1/16*** | (2006.01) |

(52) U.S. Cl.

CPC ............ *B29C 70/304* (2021.05); *B29C 70/30* (2013.01); *B29C 70/54* (2013.01); *B29D 22/00* (2013.01); *F17C 1/16* (2013.01); *B29L 2031/7156* (2013.01); *F17C 2201/0109* (2013.01); *F17C 2203/0624* (2013.01); *F17C 2203/0673* (2013.01); *F17C 2209/2163* (2013.01); *F17C 2209/232* (2013.01)

(58) Field of Classification Search

None

See application file for complete search history.

(56) References Cited

U.S. PATENT DOCUMENTS 5,211,306 A 5/1993 Delonge-Immik et al.
5,547,533 A * 8/1996 Berglund ............ B29C 66/1162 156/169

(Continued)

FOREIGN PATENT DOCUMENTS

JP 2001074199 A 3/2001
WO 9220954 A1 11/1992

OTHER PUBLICATIONS

Extended European Search Report, dated Jan. 7, 2025, regarding EP Application No. 24190288.1, 9 pages.

(Continued)

*Primary Examiner* — Michael N Orlando
*Assistant Examiner* — Abhishek A Patwardhan
(74) *Attorney, Agent, or Firm* — Yee & Associates, P.C.

(57) ABSTRACT

A composite pressure hull and methods of forming the composite pressure hull are presented. A unitary first half of the composite pressure hull is laid up. A unitary second half of the composite pressure hull is laid up. The unitary first half is joined to the unitary second half to form the composite pressure hull.

23 Claims, 7 Drawing Sheets

(56) References Cited

U.S. PATENT DOCUMENTS

| | | | | |
|---|---|---|---|---|
| 8,752,293 | B2 | 6/2014 | Jones et al. | |
| 2007/0205201 | A1* | 9/2007 | Cundiff | F17C 1/06 220/591 |
| 2008/0230652 | A1* | 9/2008 | Biornstad | B29C 70/32 244/120 |
| 2012/0234840 | A1* | 9/2012 | Strassburger | B29C 70/24 156/196 |
| 2013/0330503 | A1* | 12/2013 | Kismarton | B29C 70/202 428/113 |
| 2016/0009368 | A1* | 1/2016 | Kismarton | B32B 5/12 428/113 |

OTHER PUBLICATIONS

Extended European Search Report, dated Nov. 27, 2024, regarding EP Application No. 24186257.2, 8 pages.
Office Action, dated Aug. 5, 2025, regarding U.S. Appl. No. 18/678,676, 19 pages.
Notice of Intention to Grant, dated Jan. 5, 2026, regarding EPO Application No. 24190288.1, 65 pages.
Final Office Action, dated Jan. 16, 2026, regarding U.S. Appl. No. 18/678,676, 21 pages.
Extended European Search Report, dated Jun. 10, 2026, regarding EPO Application No. 26179248.5, 9 pages.

* cited by examiner

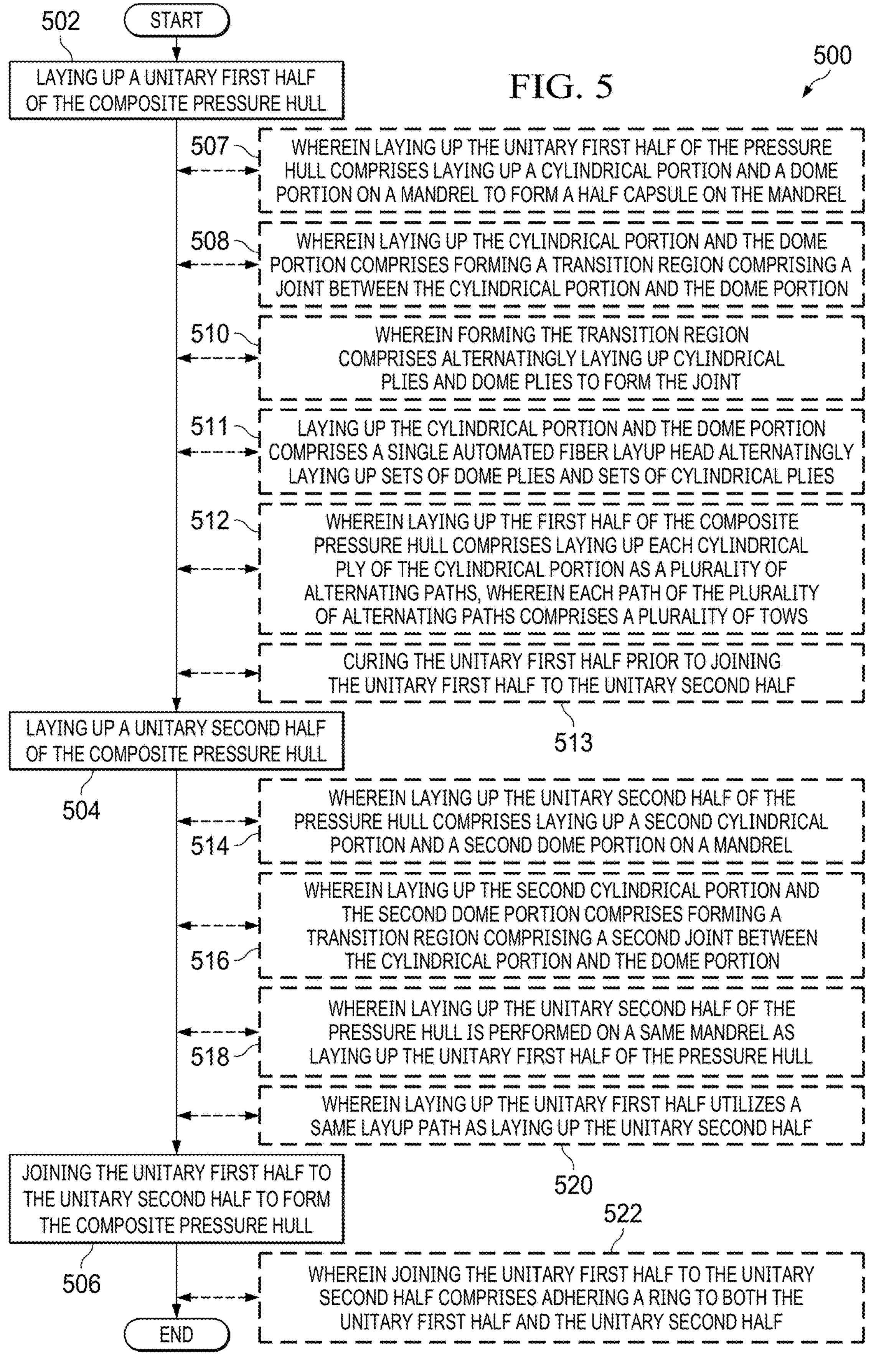

FIG. 5
500
START
502
LAYING UP A UNITARY FIRST HALF OF THE COMPOSITE PRESSURE HULL
507
WHEREIN LAYING UP THE UNITARY FIRST HALF OF THE PRESSURE HULL COMPRISES LAYING UP A CYLINDRICAL PORTION AND A DOME PORTION ON A MANDREL TO FORM A HALF CAPSULE ON THE MANDREL
508
WHEREIN LAYING UP THE CYLINDRICAL PORTION AND THE DOME PORTION COMPRISES FORMING A TRANSITION REGION COMPRISING A JOINT BETWEEN THE CYLINDRICAL PORTION AND THE DOME PORTION
510
WHEREIN FORMING THE TRANSITION REGION COMPRISES ALTERNATINGLY LAYING UP CYLINDRICAL PLIES AND DOME PLIES TO FORM THE JOINT
511
LAYING UP THE CYLINDRICAL PORTION AND THE DOME PORTION COMPRISES A SINGLE AUTOMATED FIBER LAYUP HEAD ALTERNATINGLY LAYING UP SETS OF DOME PLIES AND SETS OF CYLINDRICAL PLIES
512
WHEREIN LAYING UP THE FIRST HALF OF THE COMPOSITE PRESSURE HULL COMPRISES LAYING UP EACH CYLINDRICAL PLY OF THE CYLINDRICAL PORTION AS A PLURALITY OF ALTERNATING PATHS, WHEREIN EACH PATH OF THE PLURALITY OF ALTERNATING PATHS COMPRISES A PLURALITY OF TOWS
CURING THE UNITARY FIRST HALF PRIOR TO JOINING THE UNITARY FIRST HALF TO THE UNITARY SECOND HALF
513
LAYING UP A UNITARY SECOND HALF OF THE COMPOSITE PRESSURE HULL
504
WHEREIN LAYING UP THE UNITARY SECOND HALF OF THE PRESSURE HULL COMPRISES LAYING UP A SECOND CYLINDRICAL PORTION AND A SECOND DOME PORTION ON A MANDREL
514
WHEREIN LAYING UP THE SECOND CYLINDRICAL PORTION AND THE SECOND DOME PORTION COMPRISES FORMING A TRANSITION REGION COMPRISING A SECOND JOINT BETWEEN THE CYLINDRICAL PORTION AND THE DOME PORTION
516
WHEREIN LAYING UP THE UNITARY SECOND HALF OF THE PRESSURE HULL IS PERFORMED ON A SAME MANDREL AS LAYING UP THE UNITARY FIRST HALF OF THE PRESSURE HULL
518
WHEREIN LAYING UP THE UNITARY FIRST HALF UTILIZES A SAME LAYUP PATH AS LAYING UP THE UNITARY SECOND HALF
520
JOINING THE UNITARY FIRST HALF TO THE UNITARY SECOND HALF TO FORM THE COMPOSITE PRESSURE HULL
506
522
WHEREIN JOINING THE UNITARY FIRST HALF TO THE UNITARY SECOND HALF COMPRISES ADHERING A RING TO BOTH THE UNITARY FIRST HALF AND THE UNITARY SECOND HALF
END

800
AIRCRAFT
802
AIRFRAME
INTERIOR
806
SYSTEMS
PROPULSION SYSTEM
ELECTRICAL SYSTEM
808
812
810
814
804
HYDRAULIC SYSTEM
ENVIRONMENTAL SYSTEM

COMPOSITE PRESSURE HULL AND METHODS OF FORMING

CROSS-REFERENCE TO RELATED APPLICATION

This application claims the benefit of U.S. Provisional Patent Application Ser. No. 63/584,684, filed Sep. 22, 2023, and entitled "Composite Pressure Hull and Methods of Forming," which is incorporated herein by reference in its entirety.

BACKGROUND INFORMATION

1. Field

The present disclosure relates generally to composite manufacturing and more specifically to manufacturing a composite pressure hull.

2. Background

Reducing weight is a concern for the storage, manufacture, or transport of different structures. Weight can also affect the performance and structural efficiency of some composite structures. For example, it is desirable to reduce the weight of aircraft components such as fuel tanks. To reduce weight of components, such as pressure tanks, it can be desirable to manufacture components from composite materials.

Composite materials are strong, light-weight materials created by combining two or more functional components. For example, a composite material may include reinforcing fibers bound in polymer resin matrix. The fibers can take the form of a unidirectional tape, woven cloth or fabric, or a braid. The mechanical properties and other material properties of composite materials can be desirable for some implementations. For example, buoyancy of composite materials can be more desirable for submersible applications.

Therefore, it would be desirable to have a method and apparatus that takes into account at least some of the issues discussed above, as well as other possible issues.

SUMMARY

An embodiment of the present disclosure provides a method of forming a composite pressure hull. A unitary first half of the composite pressure hull is laid up. A unitary second half of the composite pressure hull is laid up. The unitary first half is joined to the unitary second half to form the composite pressure hull.

Another embodiment of the present disclosure provides a method of forming a composite pressure hull. Dome plies and cylindrical plies are laid up on a mandrel to form a unitary first half of the composite pressure hull. Second dome plies and second cylindrical plies are laid up on a mandrel to form a unitary second half of the composite pressure hull. The unitary first half and the unitary second half are joined to form the composite pressure hull.

A further embodiment of the present disclosure provides a composite pressure hull. The composite pressure hull comprises a unitary first half and a unitary second half. The unitary first half of the composite pressure hull comprises a dome portion and a cylindrical portion with a transition region comprising a joint formed during layup between the dome portion and the cylindrical portion. The unitary second half of the composite pressure hull comprises a second dome portion and a second cylindrical portion with a second transition region comprising a second joint formed during layup between the second dome portion and the second cylindrical portion.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is a flowchart of a method of forming a composite pressure hull in accordance with an illustrative embodiment;

DETAILED DESCRIPTION

Figure 1:
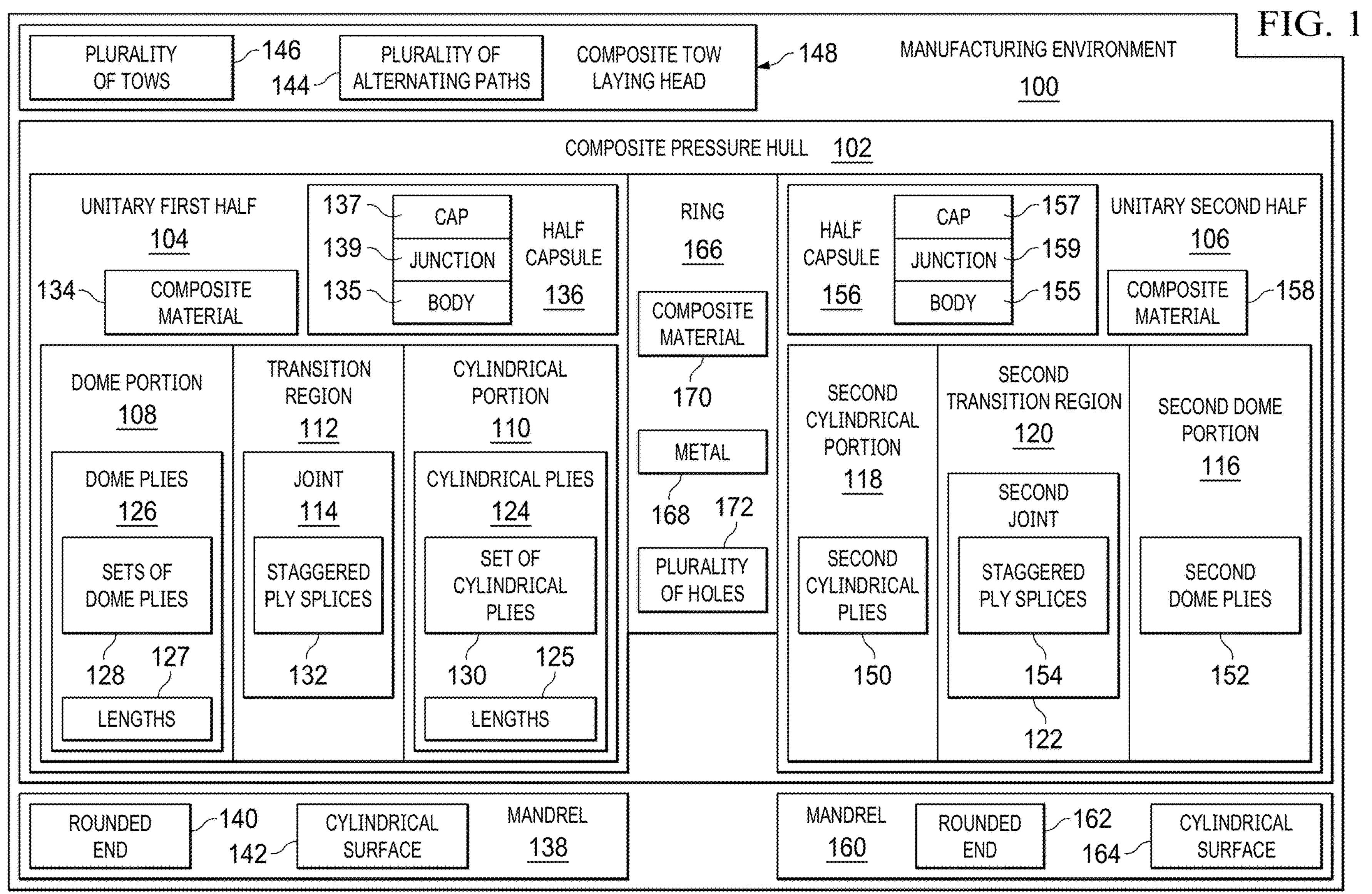
FIG. 1 is an illustration of a block diagram of a manufacturing environment in accordance with an illustrative embodiment.

Turning now to FIG. 1, an illustration of a block diagram of a manufacturing environment is depicted in accordance with an illustrative embodiment. Composite pressure hull 102 can be formed in manufacturing environment 100. Composite pressure hull 102 comprises unitary first half 104 of composite pressure hull 102 and unitary second half 106 of composite pressure hull 102. Unitary first half 104 comprises dome portion 108 and cylindrical portion 110 with transition region 112 comprising joint 114 formed during layup between dome portion 108 and cylindrical portion 110. Unitary second half 106 of composite pressure hull 102 comprises second dome portion 116 and second cylindrical portion 118 with second transition region 120 comprising second joint 122 formed during layup between second dome portion 116 and second cylindrical portion 118.

Dome portion 108 comprises dome plies 126 laid up on rounded end 140 of mandrel 138. Dome plies 126 are laid up entirely on rounded end 140 of mandrel 138. Cylindrical portion 110 comprises cylindrical plies 124 laid up on cylindrical surface 142. At least one cylindrical ply of cylindrical plies 124 extends onto rounded end 140 of mandrel 138. Portions of cylindrical plies 124 that extend onto rounded end 140 form transition region 112.

In some illustrative examples, a cylindrical ply of cylindrical plies 124 is a composite ply that is generally started on cylindrical surface 142 and transitions to a portion of rounded end 140 of mandrel 138. In some illustrative examples, many of cylindrical plies 124 will continue onto rounded end 140 of mandrel 138. In some illustrative examples, all of cylindrical plies 124 will continue onto rounded end 140 of mandrel 138. Material characteristics of dome plies 126 may be undesirable at the edge of rounded end 140 where rounded end 140 meets cylindrical surface 142. Accordingly, dome plies 126 can be laid up on rounded end 140 and terminate prior to an intersection with cylindrical surface 142.

Transition region 112 comprises cylindrical plies 124 of cylindrical portion 110 and dome plies 126 of dome portion 108. In some illustrative examples, transition region 112 is formed on rounded end 140 of mandrel 138.

In some illustrative examples, joint 114 is formed within transition region 112. In some illustrative examples, joint 114 takes the form of at least one scarf joint. In some illustrative examples, joint 114 takes the form of staggered ply splices 132. In some illustrative examples, joint 114 is formed by staggering lengths 127 of dome plies 126. In some illustrative examples, joint 114 is formed by staggering lengths 125 of cylindrical plies 124. In some illustrative examples, joint 114 comprises overlapping sets of dome plies 128 and sets of cylindrical plies 130. As used herein, a "set of" items is one or more items. Accordingly, each set of sets of dome plies 128 comprises one or more dome plies. Each set of sets of cylindrical plies 130 comprises one or more cylindrical plies. In some illustrative examples, joint 114 is formed by a series of abutting sets of dome plies 128 and sets of cylindrical plies 130.

In some illustrative examples, joint 114 comprises abutting plies between sets of dome plies 128 and sets of cylindrical plies 130. In some illustrative examples, joint 114 comprises slightly gapping sets of dome plies 128 and sets of cylindrical plies 130.

In some illustrative examples, transition region 112 has a series of joints between plies at the same thickness. In these illustrative examples, transition region 112 includes at least one additional joint in addition to joint 114. In some illustrative examples, transition region 112 comprises a set of joints, including joint 114, that are staggered through the thickness of unitary first half 104 and separated to minimize repetition at any location within transition region 112.

In some illustrative examples, laying up dome plies 126 and cylindrical plies 124 comprises alternatively laying up sets of dome plies 128 and sets of cylindrical plies 130 to form joint 114. Each set of plies for both the sets of dome plies 128 and sets of cylindrical plies 130 comprises any desirable quantity, any desirable fiber angle, and any desirable size of composite plies. The quantity of plies, fiber angle, and size of plies is based on a design for unitary first half 104. Each set of plies has its own independent order of plies, quantity of plies, fiber angles, and size of plies.

In some illustrative examples, a set of plies comprises more than one ply. In some illustrative examples, a set of plies comprises more than one size of ply. In some illustrative examples, a set of plies comprises more than one fiber angle.

As each set of plies can have any desirable characteristics, a subsequently laid set of plies can have at least one of a different quantity of plies, different fiber angles, or different sizes of plies than a previously laid set of plies.

Thus, laying up dome plies 126 and laying up of cylindrical plies 124 is performed in concert to form transition region 112. In some illustrative examples, a dome ply of dome plies 126 can be laid up at the same time as a cylindrical ply of cylindrical plies 124. In some illustrative examples, a single automated fiber layup head, such as composite tow laying head 148, can be used to alternatingly lay-up dome plies 126 and cylindrical plies 124.

Dome plies 126 and cylindrical plies 124 are laid up and cured on mandrel 138. After curing, unitary first half 104 is half capsule 136 that can be joined to unitary second half 106 to form composite pressure hull 102. Half capsule 136 is formed without any openings or holes in dome plies 126. In some illustrative examples, half capsule 136 is formed without any openings or holes aside from the opening of half capsule 136 formed by cylindrical plies 124.

Half capsule 136 comprises body 135 and cap 137 with junction 139 between body 135 and cap 137. In some illustrative examples, junction 139 is a location in which the curvature changes. In some illustrative examples, body 135 is formed entirely by cylindrical portion 110. In some illustrative examples, cap 137 includes transition region 112. In some illustrative examples, cap 137 comprises dome portion 108, transition region 112, and a fraction of cylindrical portion 110.

Unitary first half 104 is formed of composite material 134. Composite material 134 is laid up by composite tow laying head 148 by laying down plurality of tows 146.

Plurality of tows 146 are laid up on rounded end 140 of mandrel 138 to form dome plies 126. Plurality of tows 146 is laid up on cylindrical surface 142 to form cylindrical plies 124. In some illustrative examples, at least one cylindrical ply of cylindrical plies 124 comprises laying up plurality of tows 146 on cylindrical surface 142 and extending partially onto rounded end 140 of mandrel 138.

Unitary second half 106 comprises second cylindrical portion 118 and second dome portion 116 with second transition region 120 between second cylindrical portion 118 and second dome portion 116. Second transition region 120 comprises second cylindrical plies 150 of second cylindrical portion 118 and second dome plies 152 of second dome portion 116. In some illustrative examples, second transition region 120 comprises second joint 122.

In some illustrative examples, second joint 122 takes the form of at least one scarf joint. In some illustrative examples, second joint 122 takes the form of staggered ply splices 154. In some illustrative examples, second joint 122 is formed by staggering lengths of second dome plies 152. In some illustrative examples, second joint 122 is formed by staggering lengths of second cylindrical plies 150. In some illustrative examples, second joint 122 comprises overlapping sets of dome plies and sets of cylindrical plies. In some illustrative examples, second joint 122 is formed by a series of abutting sets of second dome plies and sets of second cylindrical plies.

In some illustrative examples, laying up second dome plies 152 and second cylindrical plies 150 comprises alternatively laying up sets of second dome plies and sets of second cylindrical plies to form second joint 122. Each set of plies comprises any desirable quantity, any desirable fiber angle, and any desirable size of composite plies. The quantity of plies, fiber angle, and size of plies is based on a design for unitary second half 106.

Laying up second dome plies 152 and laying up of second cylindrical plies 150 is performed in concert to form second transition region 120. In some illustrative examples, a dome ply of second dome plies 152 can be laid up at the same time as a cylindrical ply of second cylindrical plies 150. In some illustrative examples, a single automated fiber layup head, such as composite tow laying head 148, can be used to alternatingly lay-up second dome plies 152 and second cylindrical plies 150.

Second dome plies 152 and second cylindrical plies 150 are laid up and cured on a same mandrel. In some illustrative examples, unitary second half 106 can be formed on a same mandrel as unitary first half 104, mandrel 138. In some illustrative examples, unitary second half 106 can be formed on rounded end 140 and cylindrical surface 142 of mandrel 138 before or after forming unitary first half 104 on mandrel 138. In some illustrative examples, unitary second half 106 is formed on a different mandrel than unitary first half 104. In some illustrative examples, unitary second half 106 is laid up and cured on mandrel 160.

Second dome portion 116 is laid up on a rounded end of a mandrel, such as either mandrel 138 or mandrel 160. Second dome portion 116 is laid up entirely on a rounded end of a mandrel. Second cylindrical portion 118 is laid up on a cylindrical surface of a mandrel, such as either mandrel 138 or mandrel 160. At least one cylindrical ply of second cylindrical portion 118 extends onto a rounded end of the mandrel. Ends of second cylindrical portion 118 that extend onto the rounded end form second transition region 120.

In some illustrative examples, a cylindrical ply of second cylindrical portion 118 is a composite ply that is generally started on a cylindrical surface, such as cylindrical surface 142, and transitions to a portion of a rounded end, such as rounded end 140 of mandrel 138. In some illustrative examples, many of second cylindrical plies 150 of second cylindrical portion 118 will continue onto rounded end 140 of mandrel 138. In some illustrative examples, all second cylindrical plies 150 of second cylindrical portion 118 will continue onto rounded end 140 of mandrel 138. Material characteristics of second dome plies 152 may be undesirable at the edge of rounded end 140 where rounded end 140 meets cylindrical surface 142. Accordingly, second dome plies 152 can be laid up on rounded end 140 and terminate prior to an intersection with cylindrical surface 142.

After curing, unitary second half 106 is half capsule 156 that can be joined to unitary first half 104 to form composite pressure hull 102. Half capsule 156 is formed without any openings or holes in second dome plies 152. In some illustrative examples, half capsule 156 is formed without any openings or holes aside from the opening of half capsule 156 formed by second cylindrical plies 150.

Half capsule 156 comprises body 155 and cap 157 with junction 159 between body 155 and cap 157. In some illustrative examples, junction 159 is a location in which the curvature changes. In some illustrative examples, body 155 is formed entirely by second cylindrical portion 118. In some illustrative examples, cap 157 includes second transition region 120. In some illustrative examples, cap 157 comprises second dome portion 116, second transition region 120, and a fraction of second cylindrical portion 118.

Unitary second half 106 is formed of composite material 158. In some illustrative examples, composite material 158 is laid up by composite tow laying head 148 by laying down plurality of tows 146. In some other illustrative examples, composite material 158 can be laid up by a different composite tow laying head than laid up unitary first half 104.

In some illustrative examples, plurality of tows 146 is laid up on rounded end 162 of mandrel 160 to form second dome plies 152. In some illustrative examples, plurality of tows 146 is laid up on cylindrical surface 164 to form second cylindrical plies 150.

In some illustrative examples, unitary first half 104 has a same layup design as unitary second half 106. In some illustrative examples, a same method is performed to layup unitary first half 104 and unitary second half 106.

Laying up a ply of unitary first half 104 or unitary second half 106 comprises laying up plurality of alternating paths 144, wherein each path of plurality of alternating paths 144 comprises plurality of tows 146. For example, each dome ply of dome portion 108 will be laid up as a plurality of alternating paths, wherein each path comprises a plurality of tows. Likewise, each cylindrical ply of cylindrical portion 110 will be laid up as a plurality of alternating paths, wherein each path comprises a plurality of tows. In some illustrative examples, laying up unitary first half 104 of composite pressure hull 102 comprises laying up each cylindrical ply of cylindrical portion 110 as plurality of alternating paths 144, wherein each path of plurality of alternating paths 144 comprises plurality of tows 146.

Composite pressure hull 102 is formed by ring 166 joining cylindrical portion 110 and second cylindrical portion 118. In some illustrative examples, to form composite pressure hull 102, ring 166 is adhered between cylindrical portion 110 and second cylindrical portion 118. Ring 166 is provided for a location for access between composite pressure hull 102 and an environment outside of composite pressure hull 102. In some illustrative examples, ring 166 comprises plurality of holes 172 to access interior of composite pressure hull 102. In some illustrative examples, ring 166 comprises metal 168. In some illustrative examples, ring 166 comprises composite material 170.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, each ply of composite pressure hull 102 is laid up by a composite tow laying head, such as composite tow laying head 148. In some illustrative examples, more than one composite tow laying head is used to lay up unitary first half 104 on mandrel 138. In some illustrative examples, different composite tow laying heads are used to lay up unitary second half 106 than are used to lay up unitary first half 104. Any desirable quantity of composite tow laying heads can be used to lay up unitary first half 104 and unitary second half 106 on mandrel 138 and/or mandrel 160.

Figure 2:
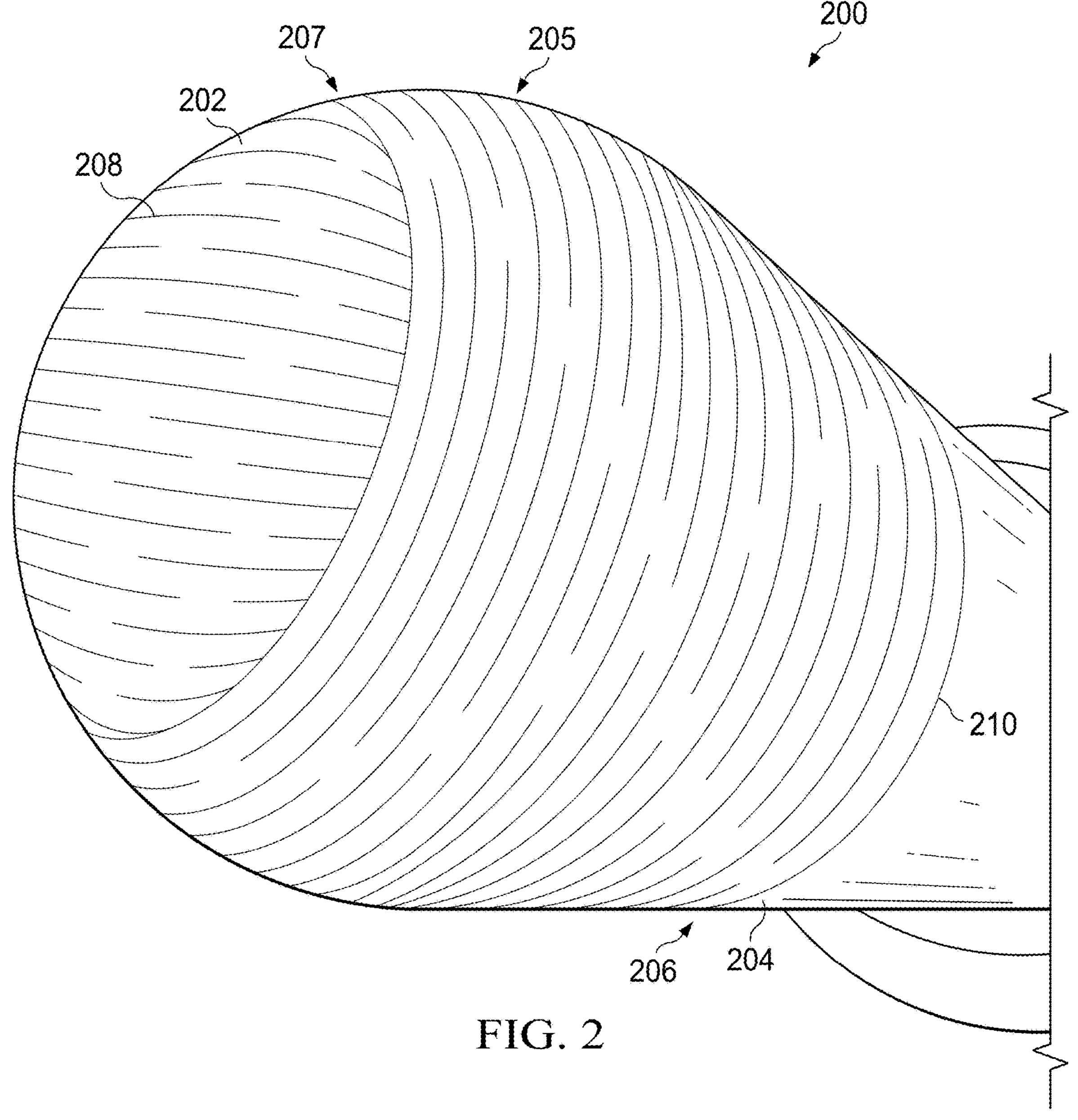
FIG. 2 is an illustration of an isometric view of a unitary first half of a composite pressure hull in accordance with an illustrative embodiment.

Turning now to FIG. 2 is an illustration of an isometric view of a unitary half of a composite pressure hull on a mandrel is depicted in accordance with an illustrative embodiment. Unitary half 200 is a physical implementation of one of unitary first half 104 or unitary second half 106 of FIG. 1.

Unitary half 200 is half of a composite pressure hull. Unitary half 200 comprises dome portion 202 and cylindrical portion 204. Unitary half 200 further comprises transition region 205 comprising a joint 207 formed during layup between dome portion 202 and cylindrical portion 204.

Unitary half 200 has been laid up on mandrel 206. Unitary half 200 is formed by laying up dome plies 208 and cylindrical plies 210 on mandrel 206. Dome plies 208 and cylindrical plies 210 are laid up in an alternating fashion to form transition region 205. The alternating fashion of layup can have any desirable characteristics. Some portion of dome plies 208 are laid up prior to laying up a portion of cylindrical plies 210. Any desired quantity and size of dome plies 208 can be laid up prior to laying up any desired quantity and size of cylindrical plies 210.

Laying up of unitary half 200 can be described as alternatingly laying up sets of dome plies of dome plies 208 and sets of cylindrical plies of cylindrical plies 210. Each set of plies for both the sets of dome plies and the sets of cylindrical plies comprises any desirable quantity, any desirable fiber angle, and any desirable size of composite plies. The quantity of plies, fiber angle, and size of plies is based on a design for unitary half 200. Each set of plies has its own independent order of plies, quantity of plies, fiber angles, and size of plies.

In some illustrative examples, a set of plies comprises more than one ply. In some illustrative examples, a set of plies comprises more than one size of ply. In some illustrative examples, a set of plies comprises more than one fiber angle.

As each set of plies can have any desirable characteristics, a subsequently laid set of plies can have at least one of a different quantity of plies, different fiber angles, or different sizes of plies than a previously laid set of plies.

Thus, laying up dome plies 208 and laying up of cylindrical plies 210 is performed in concert to form transition region 205. In some illustrative examples, a dome ply of dome plies 208 can be laid up at the same time as a cylindrical ply of cylindrical plies 210. In some illustrative examples, a single automated fiber layup head can be used to alternatingly lay-up dome plies 208 and cylindrical plies 210.

Dome plies 208 and cylindrical plies 210 are laid up and cured on mandrel 206. After curing, unitary half 200 is a half capsule that can be joined to a unitary second half to form a composite pressure hull.

As can be seen in FIG. 2, unitary half 200 has a dome portion 202 without any openings or holes. Dome portion 202 completely covers a respective rounded end of mandrel 206. Cylindrical portion 204 completely covers a respective cylindrical surface of mandrel 206.

Figure 3:
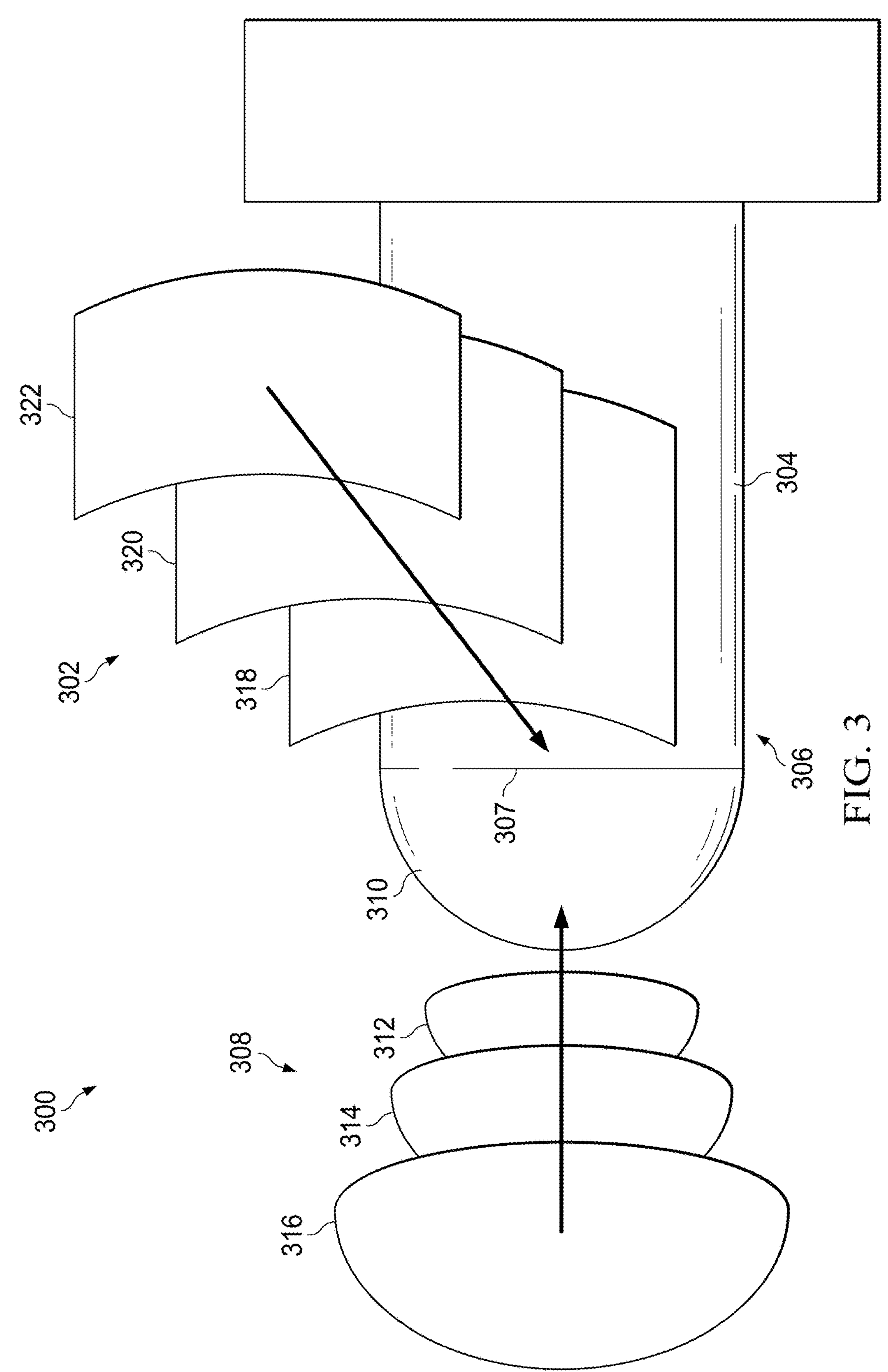
FIG. 3 is an illustration of sets of composite plies relative to a mandrel in accordance with an illustrative embodiment.

Turning now to FIG. 3, an illustration of sets of composite plies relative to a mandrel is depicted in accordance with an illustrative embodiment. In view 300, sets of cylindrical plies 302 are depicted exploded over cylindrical surface 304 of mandrel 306. In view 300, sets of dome plies 308 are depicted exploded over rounded end 310 of mandrel 306.

View 300 is only provided for ease of explanation. Each ply will be laid up not as a single sheet, but as a plurality of alternating paths, wherein each path of the plurality of alternating paths comprises a plurality of tows. Each ply is laid up by an automated fiber placement head laying up the plurality of alternating paths onto mandrel 306. View 300 is provided for explanation of the concerted lay-up of dome plies and cylindrical plies to form a dome portion and a cylindrical portion of a unitary half such as unitary first half 104 or unitary second half 106 of FIG. 1. Sets of cylindrical plies 302 and sets of dome plies 308 can be used to lay up unitary half 200 of FIG. 2.

Sets of dome plies 308 comprises set of dome plies 312, set of dome plies 314, and set of dome plies 316. Set of dome plies 312 comprises any desirable quantity of plies, any desirable fiber angles of plies, and any desirable size of plies. Set of dome plies 312 comprises one or more plies. Set of dome plies 312 comprises one or more fiber angles. Set of dome plies 312 comprises one or more ply sizes. Likewise, set of dome plies 314 and set of dome plies 316 comprises any desirable quantity of plies, any desirable fiber angles of plies, and any desirable size of plies.

As depicted, set of dome plies 312 is smaller than set of dome plies 314. Set of dome plies 314 covers more of rounded end 310 of mandrel 306 than set of dome plies 312. Differences in size between set of dome plies 312, set of dome plies 314, and set of dome plies 316 can be used to form a transition region between a dome portion and a cylindrical portion of a unitary half of a composite pressure hull.

As depicted, each of sets of dome plies 308 will cover a center of rounded end 310 of mandrel 306. Accordingly, a resulting dome portion of a composite pressure hull will not have a center hole at the apex of the dome portion.

Each of sets of cylindrical plies 302 has a different length. For example, set of cylindrical plies 318 is longer than set of cylindrical plies 320. Set of cylindrical plies 320 is longer than set of cylindrical plies 322. Staggering the lengths of sets of cylindrical plies 302 can be done to form a transition region between a resulting dome portion and resulting cylindrical portion. Staggering the lengths of sets of cylindrical plies 302 can be done to form a joint with sets of dome plies 308.

A resulting cylindrical portion comprising sets of cylindrical plies 302. In some illustrative examples, at least one set of sets of cylindrical plies 302 extends over junction 307 between cylindrical surface 304 and rounded end 310 and onto rounded end 310 of mandrel 306. Junction 307 is a location in which the curvature changes between cylindrical surface 304 and rounded end 310.

Sets of cylindrical plies 302 and sets of dome plies 308 can be laid up in any desirable order. In some illustrative examples, each of sets of dome plies 308 is laid up prior to a respective set of cylindrical plies. In some other illustrative examples, more than one set of plies from either of sets of dome plies 308 or sets of cylindrical plies 302 is laid up prior to laying up plies from the other of sets of dome plies 308 or sets of cylindrical plies 302.

In one illustrative example, set of dome plies 312 is laid up followed by set of cylindrical plies 318, set of dome plies 314, set of cylindrical plies 320, set of dome plies 316, and set of cylindrical plies 322. In another illustrative example, set of dome plies 312 is laid up followed by set of dome plies 314, set of cylindrical plies 318, set of cylindrical plies 320, set of dome plies 316, and set of cylindrical plies 322. Any desirable order of sets of plies can be laid up based on a design for the unitary half. Any desirable order of sets of plies can be laid up based on a design for the transition region within the unitary half.

Although view 300 is an exploded view, each ply of sets of cylindrical plies 302 is laid up as a plurality of alternating paths of a plurality of tows onto mandrel 306. Sets of cylindrical plies 302 are not picked and placed as plies. Likewise, although view 300 is an exploded view, each ply of sets of dome plies 308 is laid up as a plurality of alternating paths of a plurality of tows onto mandrel 306.

After curing, the unitary first half formed on mandrel 306 will have a half capsule shape. The half capsule shape will comprise a cap over rounded end 310 of mandrel 306, a body over cylindrical surface 304 of mandrel 306, and a junction connecting the cap and the body. The junction will be positioned at the connection between rounded end 310 and cylindrical surface 304 of mandrel 306.

The cap of the half capsule shape of the unitary first half will comprise sets of dome plies 308. The body of the half capsule shape of the unitary first half will comprise sets of cylindrical plies 302. Ends of cylindrical plies will extend onto rounded end 310 and will form part of the cap in the unitary first half. The transition region formed between sets of dome plies 308 and sets of cylindrical plies 302 will be laid up on rounded end 310 and will be present in the cap.

Figure 4:
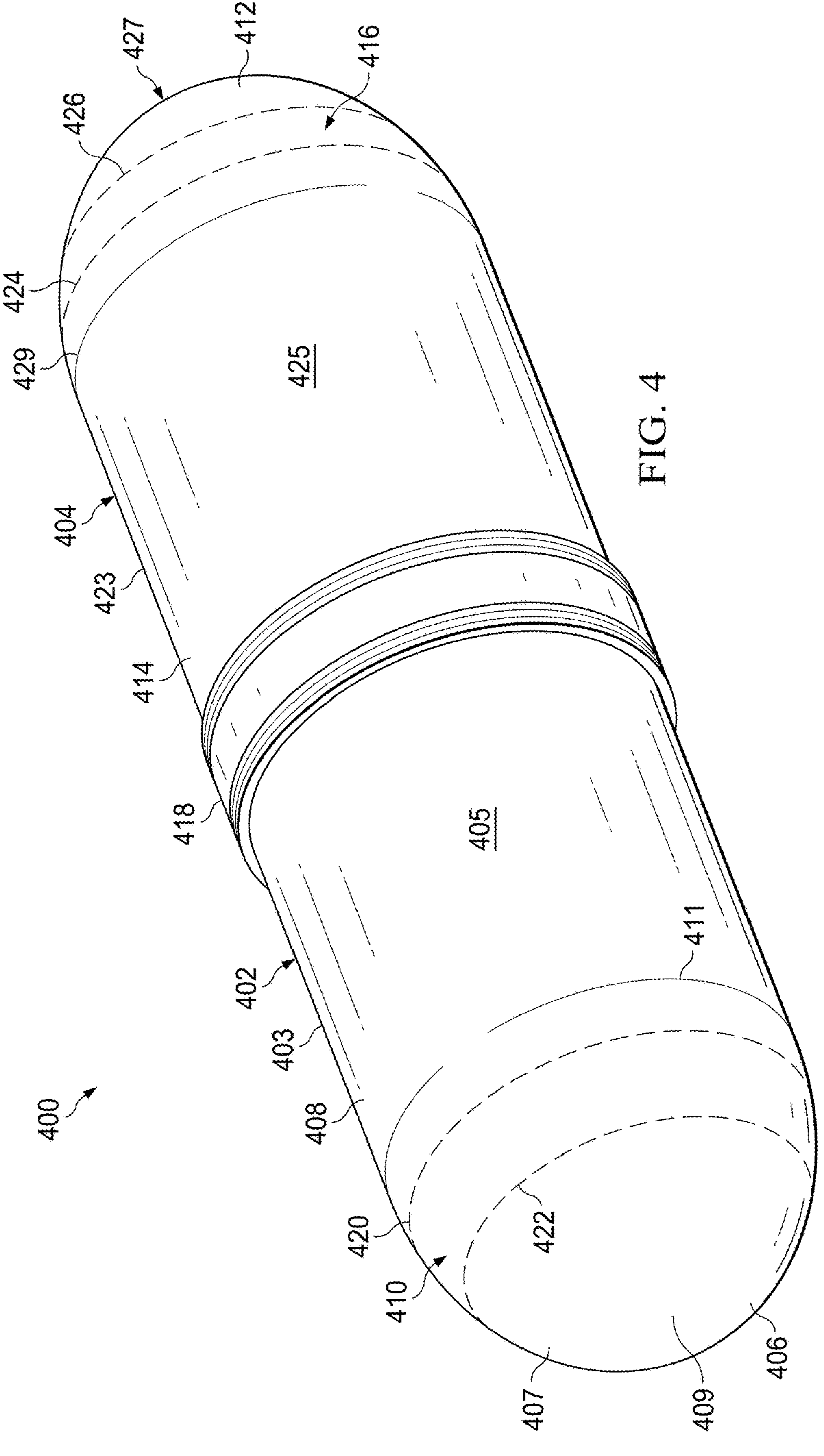
FIG. 4 is an illustration of an isometric view of a composite pressure hull in accordance with an illustrative embodiment.

Turning now to FIG. 4, an illustration of an isometric view of a composite pressure hull is depicted in accordance with an illustrative embodiment. Composite pressure hull 400 is a physical implementation of composite pressure hull 102 of FIG. 1. One of unitary first half 402 or unitary second half 404 of composite pressure hull 400 can be the same as unitary half 200 of FIG. 2.

Composite pressure hull 400 comprises unitary first half 402 and unitary second half 404. Unitary first half 402 comprises dome portion 406 and cylindrical portion 408 with transition region 410 comprising a joint formed during layup between dome portion 406 and cylindrical portion 408. Transition region 410 comprises cylindrical plies of cylindrical portion 408 and dome plies of dome portion 406.

Unitary first half 402 takes the form of half capsule 403 comprising body 405, cap 407, and junction 411 between body 405 and cap 407. The curvature of half capsule 403 changes at junction 411 between body 405 and cap 407.

In some illustrative examples, body 405 is formed entirely of cylindrical portion 408. In some illustrative examples, cap 407 comprises transition region 410. In some illustrative examples, cap 407 includes dome portion 406, transition region 410, and ends of cylindrical portion 408.

Transition region 410 is positioned at any desirable location in unitary first half 402 between dome portion 406 and cylindrical portion 408. The length of dome portion 406 can be adjusted based on a design of unitary first half 402. Transition region 410 is located based on the length of dome portion 406. In some illustrative examples, transition region 410 is formed on a respective rounded end of a mandrel. In some illustrative examples, transition region 410 is positioned between boundary 420 and boundary 422 in unitary first half 402.

Dome portion 406 of composite pressure hull 400 does not have a center hole at apex 409 of dome portion 406. In some illustrative examples, for a location system with an X-axis (0 degrees) extending through apex 409 and parallel to body 405 and a Y-axis (90 degrees) extending through junction 411, transition region 410 can be positioned in the range of 45 degrees to 75 degrees.

Unitary second half 404 of composite pressure hull 400 comprises second dome portion 412 and second cylindrical portion 414 with second transition region 416 comprising a second joint formed during layup between second dome portion 412 and second cylindrical portion 414. Second transition region 416 comprises cylindrical plies of second cylindrical portion 414 and dome plies of second dome portion 412.

As depicted, unitary first half 402 is a half capsule. As depicted, unitary second half 404 is a half capsule. In some illustrative examples, unitary first half 402 has a same layup design as unitary second half 404.

Unitary second half 404 takes the form of half capsule 423 comprising body 425, cap 427, and junction 429 between body 425 and cap 427. The curvature of half capsule 423 changes at junction 429 between body 425 and cap 427.

In some illustrative examples, body 425 is formed entirely of second cylindrical portion 414. In some illustrative examples, cap 427 comprises second transition region 416. In some illustrative examples, cap 407 includes second dome portion 412, second transition region 416, and ends of second cylindrical portion 414.

Second transition region 416 is positioned at any desirable location in unitary second half 404 between second dome portion 412 and second cylindrical portion 414. The length of second dome portion 414 can be adjusted based on a design of unitary second half 404. Second transition region 416 is located based on the length of second dome portion 412. In some illustrative examples, second transition region 416 is formed on a respective rounded end of a mandrel. In some illustrative examples, second transition region 416 is positioned between boundary 424 and boundary 426 in unitary second half 404.

Second dome portion 412 of composite pressure hull 400 does not have a center hole at an apex of second dome portion 412. In some illustrative examples, for a location system with an X-axis (0 degrees) extending through the apex and parallel to body 425 and a Y-axis (90 degrees) extending through junction 429, second transition region 416 can be positioned in the range of 45 degrees to 75 degrees.

Composite pressure hull further comprises ring 418 between cylindrical portion 408 and second cylindrical portion 414. Ring 418 is connected to cylindrical portion 408 and second cylindrical portion 414 in any desirable fashion. In some illustrative examples, ring 418 is mechanically fastened to cylindrical portion 408 and second cylindrical portion 414. In some illustrative examples, composite pressure hull further comprises ring 418 adhered between cylindrical portion 408 and second cylindrical portion 414. In some illustrative examples, ring 418 comprises a metal. In some illustrative examples, ring 418 comprises a composite material. Ring 418 may be referred to as an interface ring. Ring 418 comprises a number of locations to receive inputs and outputs with an environment outside of composite pressure hull 400.

Turning now to FIG. 5, a flowchart of a method of forming a composite pressure hull is depicted in accordance with an illustrative embodiment. Method 500 can be performed to form a composite pressure hull, such as composite pressure hull 102 of FIG. 1. Method 500 can be performed to form unitary half 200 of FIG. 2. Method 500 can be performed using a unitary half laid up and cured on mandrel 306 of FIG. 3. Method 500 can be performed to form a composite pressure hull, such as composite pressure hull 400 of FIG. 4.

Method 500 lays up a unitary first half of the composite pressure hull (operation 502). Method 500 lays up a unitary second half of the composite pressure hull (operation 504). Method 500 joins the unitary first half to the unitary second half to form the composite pressure hull (operation 506). Afterwards, method 500 terminates.

In some illustrative examples, laying up the unitary first half of the composite pressure hull comprises laying up a cylindrical portion and a dome portion on a mandrel to form a half capsule on the mandrel (operation 507). In some illustrative examples, laying up the cylindrical portion and the dome portion comprises forming a transition region comprising a joint between the cylindrical portion and the dome portion (operation 508). In some illustrative examples, the dome portion is laid up on a rounded end of the mandrel. In some illustrative example, the cylindrical portion is laid up on a cylindrical surface of the mandrel. In some illustrative examples, portions of at least a number of cylindrical plies of the cylindrical portion extend onto the rounded end of the mandrel. In some illustrative examples, the transition region is formed primarily on the rounded end of the mandrel. In some illustrative examples, the transition region is formed by cylindrical plies extending onto the rounded end of the mandrel.

The joint is formed simultaneously with forming the dome portion and the cylindrical portion. In these illustrative examples, the joint can take any desirable form. In some illustrative examples, the joint between the dome portion and the cylindrical portion at the same level can be gapped, butted, overlapped or something else. In some illustrative examples, the joint comprises two scarfs staggered through the thickness of the unitary first half.

In some illustrative examples, forming the transition region comprises alternatingly laying up cylindrical plies and dome plies to form the joint (operation 510). Laying up dome plies and laying up cylindrical plies are performed in concert to form the transition region.

In some illustrative examples, laying up the unitary first half of the composite pressure hull comprises laying up each cylindrical ply of the cylindrical portion as a plurality of alternating paths, wherein each path of the plurality of alternating paths comprises a plurality of tows (operation 512). In some illustrative examples, laying up the unitary first half of the composite pressure hull comprises laying up each dome ply of the dome portion as a plurality of alternating paths, wherein each path of the plurality of alternating paths comprises a plurality of tows. In some illustrative examples, laying up the cylindrical portion and the dome portion comprises a single automated fiber layup head alternatingly laying up sets of dome plies and sets of cylindrical plies (operation 511).

In some illustrative examples, method 500 cures the unitary first half prior to joining the unitary first half to the unitary second half (operation 513). In some illustrative examples, method 500 cures the unitary second half prior to joining the unitary first half to the unitary second half.

In some illustrative examples, laying up the unitary second half of the composite pressure hull comprises laying up a second cylindrical portion and a second dome portion on a mandrel (operation 514). In some illustrative examples, laying up the second cylindrical portion and the second dome portion comprises forming a transition region comprising a second joint between the second cylindrical portion and the second dome portion (operation 516). In some illustrative examples, laying up the unitary second half of the composite pressure hull comprises laying up each second cylindrical ply of the second cylindrical portion as a plurality of alternating paths, wherein each path of the plurality of alternating paths comprises a plurality of tows. In some illustrative examples, laying up the unitary second half of the composite pressure hull comprises laying up each second dome ply of the second dome portion as a plurality of alternating paths, wherein each path of the plurality of alternating paths comprises a plurality of tows.

In some illustrative examples, laying up the unitary second half of the composite pressure hull is performed on a same mandrel as laying up the unitary first half of the composite pressure hull (operation 518). In some illustrative examples, laying up the unitary first half utilizes a same layup path as laying up the unitary second half (operation 520).

In some illustrative examples, joining the unitary first half to the unitary second half comprises adhering a ring to both the unitary first half and the unitary second half (operation 522). In some illustrative examples, the ring can also be referred to as a weldment ring. In some illustrative examples, the ring can also be referred to as an interface ring. In some illustrative examples, the ring comprises metal. In some illustrative examples, the ring comprises composite material.

Figure 6:
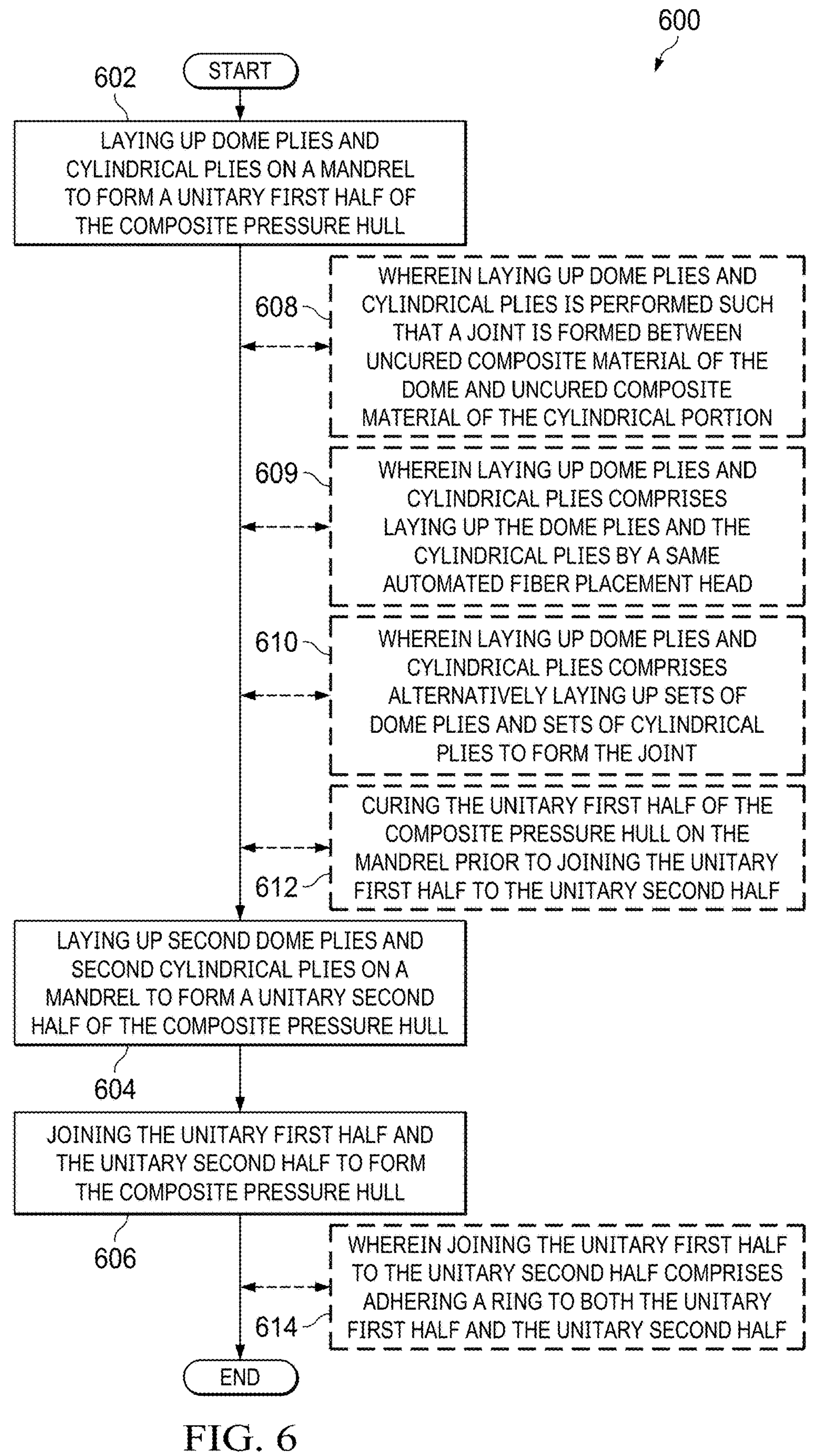
FIG. 6 is a flowchart of a method of forming a composite pressure hull in accordance with an illustrative embodiment.

Turning now to FIG. 6, a flowchart of a method of forming a composite pressure hull is depicted in accordance with an illustrative embodiment. Method 600 can be performed to form a composite pressure hull, such as composite pressure hull 102 of FIG. 1. Method 600 can be performed to form unitary half 200 of FIG. 2. Method 500 can be performed using a unitary half laid up and cured on mandrel 306 of FIG. 3. Method 600 can be performed to form a composite pressure hull, such as composite pressure hull 400 of FIG. 4.

Method 600 lays up dome plies and cylindrical plies on a mandrel to form a unitary first half of the composite pressure hull (operation 602). Method 600 lays up second dome plies and second cylindrical plies on a mandrel to form a unitary second half of the composite pressure hull (operation 604). Method 600 joins the unitary first half and the unitary second half to form the composite pressure hull (operation 606). Afterward, method 600 terminates.

In some illustrative examples, laying up dome plies and cylindrical plies is performed such that a joint is formed between uncured composite material of a dome portion and uncured composite material of a cylindrical portion (operation 608). In these illustrative examples, the joint can take any desirable form. In some illustrative examples, the joint between the dome portion and the cylindrical portion at the same level can be at least one of gapped, butted, overlapped or something else. In some illustrative examples, the joint comprises two scarfs staggered through the thickness of the unitary first half. In some illustrative examples, laying up dome plies and cylindrical plies comprises laying up the dome plies and the cylindrical plies by a same automated fiber placement head (operation 609).

In some illustrative examples, laying up dome plies and cylindrical plies comprises alternatively laying up sets of dome plies and sets of cylindrical plies to form the joint (operation 610). By alternatively laying up sets of dome plies and sets of cylindrical plies, the transition region is formed of the dome plies and the cylindrical plies.

In some illustrative examples, method 600 cures the unitary first half of the composite pressure hull on the mandrel prior to joining the unitary first half to the unitary second half (operation 612). In some illustrative examples, joining the unitary first half to the unitary second half comprises adhering a ring to both the unitary first half and the unitary second half (operation 614).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items. As used herein, "a set," when used with reference to items means one or more items. Thus, a set of plies includes one or more plies.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 508 through operation 522 may be optional. As another example, operation 608 through operation 614 may be optional.

The illustrative examples provide methods and designs for composite pressure hulls. In some illustrative examples, the composite pressure hull can be used in high pressure environments. In some illustrative examples, the composite pressure hull can be used as a submersible vehicle. In some illustrative examples, the composite pressure hull can be used to hold high pressure. In some illustrative examples, the composite pressure hull can be used to hold cryogenic fuel or other high pressure gaseous fuel. In some illustrative examples, the composite pressure hull can be used on an aircraft.

Figures 7, 8:
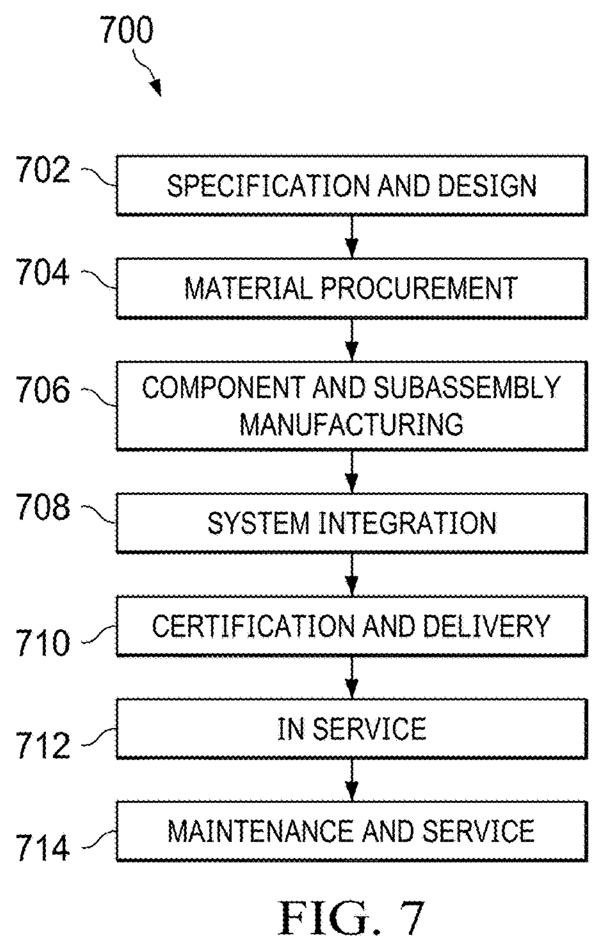
FIG. 7 is an illustration of an aircraft manufacturing and service method in a form of a block diagram in accordance with an illustrative embodiment.
FIG. 8 is an illustration of an aircraft in a form of a block diagram in which an illustrative embodiment may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7. For example, a fuel tank or other pressure vessel of aircraft 800 can be manufactured according to the illustrative examples.

Conventional composite pressure hulls have a hole at the apex of the dome for system integrations for fuel, etc. The illustrative examples provide a continuous dome composite structure. The cylinder and dome portion are integrated together through a joint, such as a scarf joint.

The illustrative examples provide a continuous, closed dome composite structure, along with an integration zone of the cylinder fibers and dome fibers. Two composite halves are fabricated and then joined at the root of the cylinder with a ring joint. In some illustrative examples, the ring joint is metallic. The illustrative examples provide the integration of a continuous dome and cylinder composite component.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite pressure hull, the method comprising:

- laying up a unitary first half of the composite pressure hull comprising a first dome and a cylindrical portion using the following steps:
  - forming the cylindrical portion by laying up staggered plies comprising varying lengths;
  - forming a first set of dome plies by laying up a plurality of alternating paths of plies over an apex of a rounded end of a mandrel;
  - forming a second set of dome plies over:
    - the apex of the rounded end of the mandrel; and
    - the first set of dome plies, the second set of dome plies comprising a larger diameter than the first set of dome plies;
- laying up a unitary second half of the composite pressure hull comprising a second dome portion; and
- forming the composite pressure hull as a capsule without any openings by joining the unitary first half to the unitary second half.

2. The method of claim 1, wherein joining the unitary first half to the unitary second half comprises adhering a ring to both the unitary first half and the unitary second half.

3. The method of claim 1, wherein laying up the unitary first half of the composite pressure hull comprises laying up a first cylindrical portion and the first dome portion on a mandrel to form a half capsule on the mandrel.

4. The method of claim 3, wherein laying up the first cylindrical portion and the first dome portion comprises forming a transition region comprising a joint between the first cylindrical portion and the first dome portion.

5. The method of claim 4, wherein forming the transition region comprises alternatingly laying up sets of cylindrical plies and sets of dome plies to form the joint, wherein each set of dome plies is a different size and each set of dome plies covers a center of a respective dome portion.

6. The method of claim 4, further comprising:

curing the unitary first half prior to joining the unitary first half to the unitary second half.

7. The method of claim 3, wherein laying up the unitary first half of the composite pressure hull comprises laying up each cylindrical ply of the first cylindrical portion as a plurality of alternating paths, wherein each path of the plurality of alternating paths comprises a plurality of tows.

8. The method of claim 3, wherein laying up the first cylindrical portion and the first dome portion comprises a single automated fiber layup head alternatingly laying up sets of the dome plies and sets of cylindrical plies.

9. The method of claim 1, wherein laying up the unitary second half of the composite pressure hull comprises laying up a second cylindrical portion and the second dome portion on a mandrel.

10. The method of claim 9, wherein laying up the second cylindrical portion and the second dome portion comprises forming a transition region comprising a second joint between the second cylindrical portion and the second dome portion.

11. The method of claim 1, wherein laying up the unitary second half of the composite pressure hull is performed on a same mandrel as laying up the unitary first half of the composite pressure hull.

12. The method of claim 1, wherein laying up the unitary first half utilizes a same layup path as laying up the unitary second half.

13. A method of forming a composite pressure hull, the method comprising:

laying up plies forming a first dome and first cylindrical plies on a mandrel to form a unitary first half of the composite pressure hull using the following steps;

forming a first cylindrical portion by laying up staggered plies comprising varying lengths;

forming a first set of dome plies by laying up a plurality of alternating paths of plies over an apex of a rounded end of a mandrel;

forming a second set of dome plies over:

the apex of the rounded end of the mandrel; and the first set of dome plies, the second set of dome plies comprising a larger diameter than the first set of dome plies;

laying up second plies forming a second dome and second cylindrical plies on a mandrel to form a unitary second half of the composite pressure hull; and forming the composite pressure hull without any openings by joining the unitary first half and the unitary second half.

14. The method of claim 13, wherein laying up dome plies and cylindrical plies is performed such that a joint is formed between uncured composite material of a dome portion and uncured composite material of a cylindrical portion.

15. The method of claim 13, wherein laying up dome plies and cylindrical plies comprises laying up the dome plies and the cylindrical plies by a same automated fiber placement head.

16. The method of claim 14, wherein laying up dome plies and cylindrical plies comprises alternatively laying up sets of dome plies and sets of cylindrical plies to form the joint.

17. The method of claim 13 further comprising:

curing the unitary first half of the composite pressure hull on the mandrel prior to joining the unitary first half to the unitary second half.

18. The method of claim 13, wherein joining the unitary first half to the unitary second half comprises adhering a ring to both the unitary first half and the unitary second half.

19. A composite pressure hull that comprises:

a unitary first half that comprises a dome portion and a cylindrical portion with a transition region that comprises a joint formed during layup between the dome portion and the cylindrical portion, wherein the cylindrical portion comprises staggered plies of varying lengths and the dome portion comprises:

a first set of dome plies that cover the apex of the dome; and a second set of dome plies that cover:

the apex of the dome; and the first set of dome plies, wherein a diameter of the second set of dome comprises a larger diameter than the first set of dome plies; and a unitary second half of the composite pressure hull comprising a second dome portion and a second cylindrical portion with a second transition region comprising a second joint formed during layup between the second dome portion and the second cylindrical portion, wherein each unitary half of the composite pressure hull are joined together as a capsule without openings.

20. The composite pressure hull of claim 19, wherein the transition region comprises cylindrical plies of the cylindrical portion and the dome plies of the dome portion.

21. The composite pressure hull of claim 19 further comprising:

a ring adhered between the cylindrical portion and the second cylindrical portion.

22. The composite pressure hull of claim 21, wherein the ring comprises a metal.

23. The composite pressure hull of claim 19, wherein the unitary first half has a same layup design as the unitary second half.

* * * * *